US010060130B2

(12) United States Patent
Alobily et al.

(10) Patent No.: US 10,060,130 B2
(45) Date of Patent: Aug. 28, 2018

(54) ASH INSULATION PANELS

(71) Applicant: KACST, Riyadh (SA)

(72) Inventors: Turky Alobily, Riyadh (SA);
Mohammed Binhussin, Riyadh (SA);
Badr Juwayr, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 147 days.

(21) Appl. No.: 14/768,395

(22) PCT Filed: Jan. 13, 2014

(86) PCT No.: PCT/IB2014/058215
§ 371 (c)(1),
(2) Date: Aug. 17, 2015

(87) PCT Pub. No.: WO2015/104588
PCT Pub. Date: Jul. 16, 2015

(65) Prior Publication Data
US 2016/0002923 A1    Jan. 7, 2016

(51) Int. Cl.
*E04C 2/26*   (2006.01)
*E04B 1/80*   (2006.01)
*E04C 2/20*   (2006.01)
*E04B 1/74*   (2006.01)

(52) U.S. Cl.
CPC ............... *E04C 2/205* (2013.01); *E04B 1/80* (2013.01); *E04B 2001/746* (2013.01); *Y02A 30/248* (2018.01)

(58) Field of Classification Search
CPC ......... E04C 2/20; E04B 1/80; E04B 2001/746
See application file for complete search history.

(56) References Cited

U.S. PATENT DOCUMENTS 4,376,833 A * 3/1983 Ferretti .................. C08G 18/68
521/107
5,019,310 A * 5/1991 Kobayashi .............. B29B 7/482
264/122

OTHER PUBLICATIONS

Abstract for JP 52074155, Jun. 21, 1977.*
Abstract for CN 102295822, Sep. 26, 2012.*
Abstract for CN 103450558, Dec. 18, 2013.*

* cited by examiner

*Primary Examiner* — C Melissa Koslow
(74) *Attorney, Agent, or Firm* — Andrew M. Calderon; Roberts Mlotkowski Safran Cole & Calderon, P.C.

(57) ABSTRACT

The present invention relates to ash recycling and use in thermal insulation (decrease of thermal transmission from inside buildings into outside, and vice versa). Ash insulation panels are made of the following basic materials: ash and Polystyrene (PS) and/or waste plastics made of Polystyrene and chemical bond. These panels have many advantages beside thermal insulation such as lightweight and low water absorption rate. They are produced by mixing the mentioned basic materials, casting the mixture into molds of variable size and shape depending on the desired product, pressing the mold, and treating the final product thermally.

17 Claims, No Drawings

ASH INSULATION PANELS

BACKGROUND OF THE INVENTION

The invention generally relates to ash insulation panels used as thermal insulation in residential, public, and commercial buildings.

The ash insulation panels of the present invention are made of a novel composition prepared from ash and plastic and/or chemicals materials locally available in commercial quantities. It provides a solution for ash and plastic waste materials by the recycling thereof, which also increases their added value.

SUMMARY OF THE INVENTION

Scientific experiments have shown that the application of thermal insulation in residential, public, and commercial buildings: reduces the consumption of electric power by about 04%, maintains proper temperature inside buildings for longer time, reduces the long time use of air conditioners, allows the use of small capacity air conditioners which are low in cost and have less energy consumption, provides comfort to the building residents, and eliminates the need for air conditioners which are a source of noise pollution that has a negative impact on people health and psychology.

Thermal insulation provides protection for buildings from weather changes and fluctuations by reducing the variation of temperature from day to night. Variation in the degree of temperature between day and night causes stress cracks in walls of buildings and their parts such windows leading them to lose their natural and mechanical properties. In addition, temperature variation reduced the thickness of walls and ceilings which results in increasing thermal transmission into buildings and consuming more electricity.

At the present time, there are several types of thermal insulation materials for buildings available in the market. The following table shows some of these types accompanied by their thermal conductivity and density:

| Material | Thermal Conductivity (W/m K) | Density (kg/m$^3$) |
| --- | --- | --- |
| Wool | 0.04 | 20-25 |
| Polystyrene EPS | 0.035-0.04 | 15-30 |
| Polystyrene XPS | 0.035-0.04 | 25-40 |
| Polyethylene foam | 0.025-0.035 | 30 |
| Glass foam | 0.04-0.055 | 10-160 |
| metal fiber | 0.035-0.05 | 15-80 |
| Vacuum | 0.002 | 1 |

The invention described herein further includes the process of producing ash insulation panels made of basic materials of different ratios and weights.

The ash insulation panels are produced by mixing ash with some types of plastics and solvents in sequential order, casting the mixture into molds of variable size and shape depending on the need, and then pressing it thermally.

One of the main features of the ash insulation panels is providing a solution that sustains environment by recycling waste and helps to rationalize the consumption of electricity.

DETAILED DESCRIPTION OF THE INVENTION

Ash insulation panels are made of the following basic materials: ash (55-70%) and polystyrene (30-45%).

After preparing the desired ratios, they are mixed in an electric or mechanical mixer. During the mixing process, (10-20%) chloroform is gradually added to the mixture. The mixing process continues until the mixture becomes almost dry. Then, the mixture is casted in an iron, plastic, or metal mold coated with thermal insulation to prevent the components from sticking to the mold. The mold is then pressed by a hydraulic piston under pressure of 3-30 tons depending on the thickness of the desired product. After the pressing process, the mold is placed in a thermal furnace for treating it at a temperature of 160-180° C. and it is left for about 2 to 4 hours. Then, when the temperature decreases into room temperature, the product is taken out from the thermal furnace.

Insulation panels can be characterized by the following physical and mechanical properties:

| Water Absorption % | Density (g/cm$^3$) | Hardness (HRG) | Compressive Strength (MPa) | Furnace Temperature C. ° |
| --- | --- | --- | --- | --- |
| 2.83 | 1.43 | 63 | 26 | 180 |

The insulation panels can be made of 60% ash, 28% polystyrene, and 12% chloroform.

The invention claimed is:

1. A thermal insulation panel comprising a mixture of ash and a polymeric material,
   wherein:
   the ash is 55-70% of the mixture and the polymeric material is 28-45% of the mixture,
   the mixture further comprises chloroform, and
   the thermal insulation panel is a cast panel.

2. The thermal insulation panel according to claim 1, wherein the polymeric material comprises polystyrene or plastic waste material.

3. The thermal insulation panel according to claim 1, having a density of 1.43 g/cm$^3$ and a water absorption of 2.83%.

4. The thermal insulation panel according to claim 1, wherein the polymeric material is polystyrene.

5. The thermal insulation panel according to claim 1, wherein the mixture is homogeneous.

6. A process for producing thermal insulation panels, comprising:
   forming a mixture of ash and a polymeric material;
   gradually adding chloroform to the mixture;
   continuing mixing until the mixture is almost dry;
   casting the mixture into a mold; and
   molding the mixture under pressure.

7. The process according to claim 6, wherein the formed mixture comprises from 55-70% ash and from 28-45% polymeric material.

8. The process according to claim 6, wherein the polymeric material is selected from polystyrene or plastic waste material.

9. The process according to claim 6, wherein the molding the mixture under pressure comprises pressing the mold by a hydraulic piston under pressure of 3-30 tons.

10. The process according to claim 6, further comprising treating the mold in a thermal furnace at a temperature of from 160-180° C. for 2 to 4 hours, then cooling to room temperature and removing a thermal insulation panel product.

11. The process according to claim 6, wherein the chloroform is added in an amount from 10-20%.

12. The process according to claim 6, wherein the polymeric material is polystyrene.

13. The process according to claim 12, wherein the amount of ash is 60%, the amount of polystyrene is 28% and the amount of chloroform is 12%.

14. The process according to claim 6, wherein the continuing mixing comprises mixing until the mixture is homogeneous.

15. The process according to claim 6, wherein the mold used in the casting the mixture is made of iron, plastic, or metal.

16. The process according to claim 15, wherein the mold is coated with thermal insulation to prevent the components from sticking to the mold.

17. A process of recycling waste, comprising mixing ash and a polymeric material in the presence of chloroform to form a mixture, casting the mixture into a mold, pressurizing the mold, subjecting the mold to heat, cooling the mold and removing a thermal insulation panel.

* * * * *